(12) United States Patent
Scobbie

(10) Patent No.: US 8,331,246 B2
(45) Date of Patent: Dec. 11, 2012

(54) MEASUREMENT SYSTEM AND METHOD OF MEASURING A TRANSIT METRIC

(75) Inventor: Donald MacGregor Scobbie, Edinburgh (GB)

(73) Assignee: JDS Uniphase Corporation, Milpitas, CA (US)

(*) Notice: Subject to any disclaimer, the term of this patent is extended or adjusted under 35 U.S.C. 154(b) by 769 days.

(21) Appl. No.: 11/488,711

(22) Filed: Jul. 18, 2006

(65) Prior Publication Data

US 2007/0058562 A1   Mar. 15, 2007

(30) Foreign Application Priority Data

Jul. 20, 2005   (GB) .................................. 0514819.2

(51) Int. Cl.
*G01R 31/08*   (2006.01)
(52) U.S. Cl. ...................................................... 370/252
(58) Field of Classification Search .................. 370/241, 370/241.1, 242, 246, 248–250, 252
See application file for complete search history.

(56) References Cited

U.S. PATENT DOCUMENTS

| | | | | |
|---|---|---|---|---|
| 5,521,907 A | * | 5/1996 | Ennis et al. .................. | 370/253 |
| 6,056,786 A | * | 5/2000 | Rivera et al. ................. | 717/168 |
| 6,308,211 B1 | | 10/2001 | Rosborough et al. | |
| 6,405,337 B1 | * | 6/2002 | Grohn et al. .................. | 714/749 |
| 7,385,924 B1 | * | 6/2008 | Riddle .......................... | 370/235 |
| 2003/0107990 A1 | | 6/2003 | Herschleb et al. | |
| 2005/0169199 A1 | * | 8/2005 | Futenma et al. ............. | 370/282 |
| 2006/0072479 A1 | * | 4/2006 | Loyd ............................ | 370/254 |
| 2006/0129693 A1 | * | 6/2006 | LeCroy et al. ............... | 709/231 |

FOREIGN PATENT DOCUMENTS

| | | |
|---|---|---|
| EP | 1093312 | 4/2001 |
| EP | 1 335 526 | 8/2005 |
| JP | 2000-312227 | 11/2000 |
| WO | WO 96/34476 | 10/1996 |

OTHER PUBLICATIONS

GB Search Report dated Nov. 9, 2005.

* cited by examiner

*Primary Examiner* — Mark Rinehart
*Assistant Examiner* — Peter Cheng
(74) *Attorney, Agent, or Firm* — Perman & Green, LLP

(57) ABSTRACT

A measurement system comprises a pair of probes located at different points in a communications network. The probes generate transaction records related to messages observed, an exchange of the messages constituting a transaction. The transaction records are passed to a data store, the data store being mined by a correlator engine to match transaction records. The timestamps contained in the matching transaction records obtained are used to calculate a transit metric by a measurement engine.

14 Claims, 4 Drawing Sheets

MEASUREMENT SYSTEM AND METHOD OF MEASURING A TRANSIT METRIC

The present invention relates to a measurement system of the type, for example, that employs passive probes capable of measuring times of observation of messages passing points coupled to the passive probes. The present invention also relates to a method of measuring a transit metric that employs the passive probes.

BACKGROUND

In the field of data communications, units of data are communicated between devices having respective source and destination addresses in a high-speed communications network. Throughout the communications network, and between the devices, so-called "routers" are interconnected to, as their name suggests, route or forward the units of data from a communications device having the source address to a communications device having the destination address as they pass from router to router. In the communications network, the data communicated between the source address and the destination address can be subject to delays and hence can arrive at the destination address late. In some cases, the data may not arrive at the destination address at all.

It is therefore the task of a network diagnostics system to identify any latency in the communications network as a first step to curing or avoiding the cause of the latency. It is, of course, known to monitor traffic in the communications network for the purpose of supporting traffic engineering applications or accounting applications. In this respect, it is desirable to observe and characterise data units known as "packets", in particular Internet Protocol (IP) packets, traversing the communications network.

One Service Assurance technology is known as Active Measurement Technology, and involves the generation, transmission and capture of well-formed synthetic traffic within a packet-switched network that supports, for example, Voice over IP (VoIP) calls to address a particular performance metric of interest in relation to a service. However, the measurements relate to the synthetic traffic and not real user traffic, and so do not reflect the experiences of the real user traffic.

An alternative technology is known as Passive Measurement Technology, and uses taps to couple first and second probes, respectively, to a link in the communications network at separate first and second respective points in the communications network in order to observe real user traffic on the link without disruption to any service being provided. These passive techniques rely on filtering, sampling and data reduction relating to observed real user traffic on the link with other annotations such as data capture timestamps. One example of such probes is the so-called Remote MONitoring (RMON) probe, as described in "SNMP, SNMPv2, SNMPv3, and RMON 1 and 2" (William Stallings, Addison Wesley). The RMON probe is used where a detailed view of network traffic is required, particularly when trouble-shooting.

U.S. Pat. No. 5,521,907 describes a non-intrusive measurement apparatus that employs a first and a second probe respectively located at different points in the communications network for measuring delays across a link in the communications network. The probes are "programmed" with patterns to recognise, the patterns being present in packets that are the subject of a monitoring task, for example monitoring of a Session Initiation Protocol (SIP) call establishment dialogue. When the first probe recognises a pre-programmed pattern traversing the link at the point where the probe is located, the first probe generates a timestamp and a unique identifier for the packet bearing the pattern recognized. A similar procedure takes place at the second probe, if and when, the packet bearing the pre-programmed pattern is also recognised by the second probe. The timestamp and unique identifier pairs are respectively stored in buffers until the buffers are full, whereafter the collected data is forwarded to a measurement console, where the collected data is matched and used to generate round trip delays and travel times.

However, when packets are re-transmitted as is commonly the case in packet-switched communication networks, the above-described apparatus is not able to distinguish between a first transmission of a packet and a subsequent re-transmission, be it a first re-transmission of the packet or a fourth re-transmission of the packet. Consequently, incorrect travel and round-trip delay times can be calculated through use of timestamps indirectly assumed to signify receipt of an initial transmission of a packet. In any event, even if the probes are aware of re-transmissions of packets, no way is suggested of determining what packets each probe has recognised, and hence of identifying the data collected as relating to a particular re-transmission of a given packet.

SUMMARY OF THE DISCLOSED EMBODIMENTS

According to a first aspect of the present invention, there is provided a measurement system for generating a transit metric, the apparatus comprising: a first probe for coupling to a first point in a communications network; a second probe for coupling to a second point in a communications network; a first data record builder associated with the first probe and arranged to generate, when in use, a first record comprising first observation data relating to a transaction; a second data record builder associated with the second probe and arranged to generate, when in use, a second record comprising second observation data relating to the transaction; a correlator arranged to determine, when in use, that the first and second records relate to the transaction; and a measurement component arranged to use, when in use, at least respective parts of the first and second records determined to relate to the transaction to calculate a transit metric.

The first observation data may comprise first time data corresponding to first at least one time of observation of at least one message associated with the transaction.

The second observation data may comprise second time data corresponding to second at least one time of observation of the at least one message associated with the transaction.

The correlator may be arranged to determine, when in use, that the first record with the second record relate to the transaction by matching data contained in the first and second records. The first and second records may comprise at least one of: a source address, a destination address and/or a key.

The correlator may be further arranged to analyse at least part of the first and second observation data to determine whether the at least part of the first and second observation data complies with a predetermined inequality. The correlator may be arranged to analyse at least part of the first and second time data to determine whether the at least part of the first and second time data is separated by less than a predetermined period of time.

The measurement component may be arranged to calculate the transit metric using at least respective parts of the first and second time data. The transit metric may be a one-way travel time. The transit metric may be a round-trip delay time.

According to a second aspect of the present invention, there is provided a method of generating a transit metric in a communications network, the method comprising: making a first observation in relation to a transaction at a first point in the communications network and building a first record comprising first observation data relating to the transaction; making a second observation in relation to the transaction at a second point in the communications network and building a second record comprising second observation data relating to the transaction; correlating the first and second records relating to the transaction; and using at least respective parts of the first and second records determined to relate to the transaction to calculate the transit metric.

The first and second observations may be respective observations of a message that is part of the transaction.

According to a third aspect of the present invention, there is provided a computer program code element comprising computer program code means to make a computer execute the method as set forth above according to the second aspect of the invention.

The computer program code element may be embodied on a computer readable medium.

According to a fourth aspect of the present invention, there is provided a use of a data record relating to a transaction in a communications network to calculate a transit metric.

It is thus possible to provide a measurement system and method of generating a transit metric that does not rely upon matching individual packets in a stream of packets and so can generate transit metrics with improved accuracy and reliability. In a network supporting a pervasive continuous network monitoring paradigm, transaction data is readily available for post-processing without a need for specific requests for transaction building to obtain such transit metrics. Further, the manner of generating transit metrics is not protocol specific and can be used in environments where transactions involve more than one, for example, application layer protocol, such as where Wireless Application Protocol (WAP) is transformed into Hyper-Text Transfer Protocol (HTTP) by a gateway.

BRIEF DESCRIPTION OF DRAWINGS

At least one embodiment of the invention will now be described, by way of example only, with reference to the accompanying drawings, in which.

DETAILED DESCRIPTION

Figure 1:
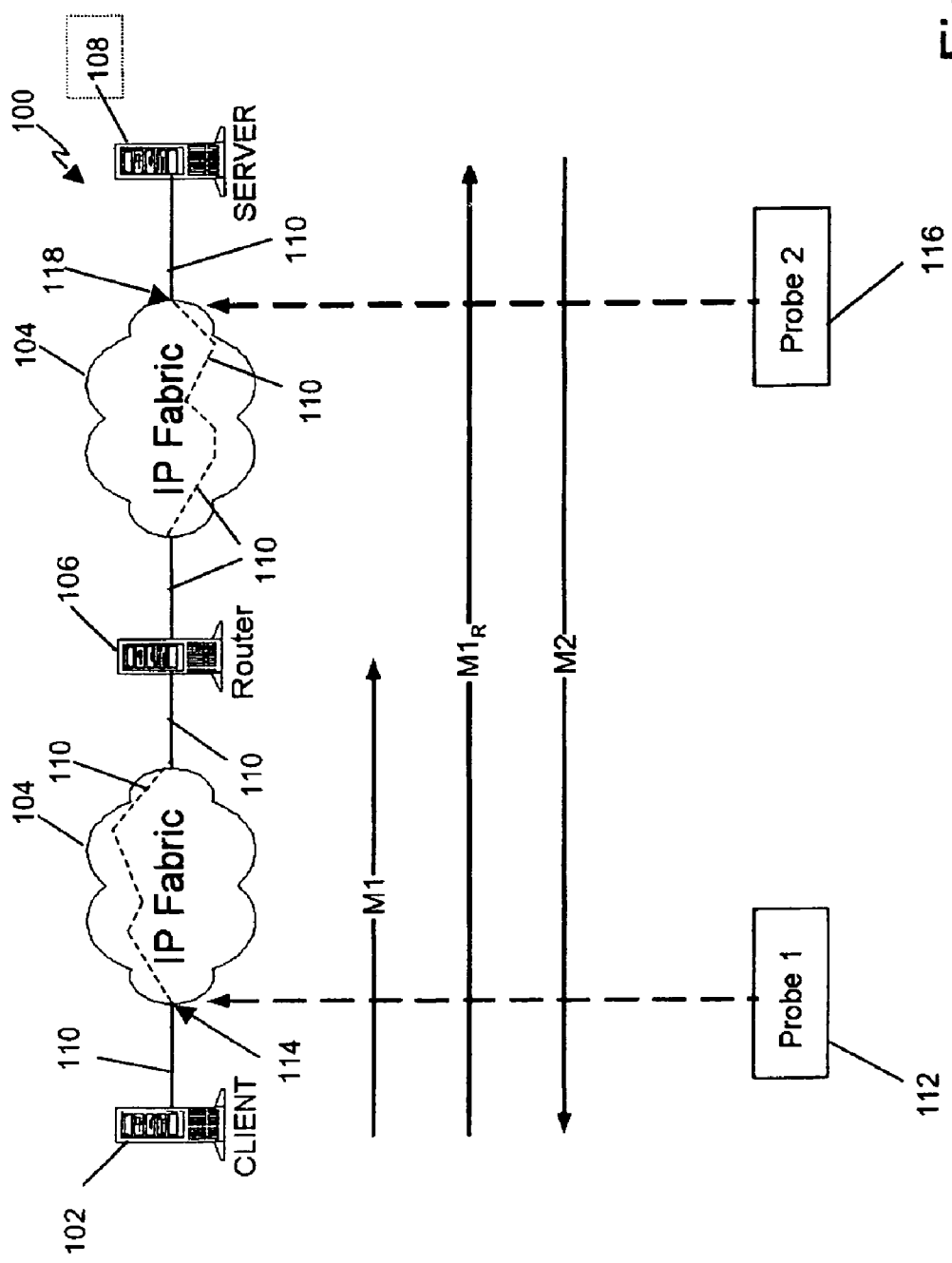
FIG. 1 is schematic diagram of a part of a communications system coupled to a part of a measuring system in accordance with a first embodiment of the invention.

Throughout the following description identical reference numerals will be used to identify like parts.

Referring to FIG. 1, a communications network 100 (shown in part in FIG. 1), comprises a client terminal 102 coupled to an Internet Protocol (IP) network fabric 104, the IP network 104 being coupled, inter alia, to a router 106. The router 106 is also coupled, via the IP fabric 104 to a server 108 with which the client terminal 102 needs to communicate. For the sake of clarity and conciseness, only a part of the communications network 100 is described herein. However, the skilled person will, of course, appreciate that the communications network 100 is larger than is shown in FIG. 1 and described herein.

A communications path for IP packets between the client terminal 102 and the server 108 constitutes a communications link 110. A first probe 112 is coupled to the communications link 110 at a first point 114 along the communications link. A second probe 116 is coupled to the communications link 110 at a second point 118 along the communications link 110.

In this example, the first and second probes 112, 116 are passive probes coupled to the communications link 110 by taps (not shown). The taps can be electrical connections or, in the case where the physical connection being tapped is an optical cable, optical splitters can be employed as taps. The first and second probes 112, 116 are part of an acceSS7 network monitoring system, the first and second probes 112, 116 comprising respective transaction building units.

Figure 2:
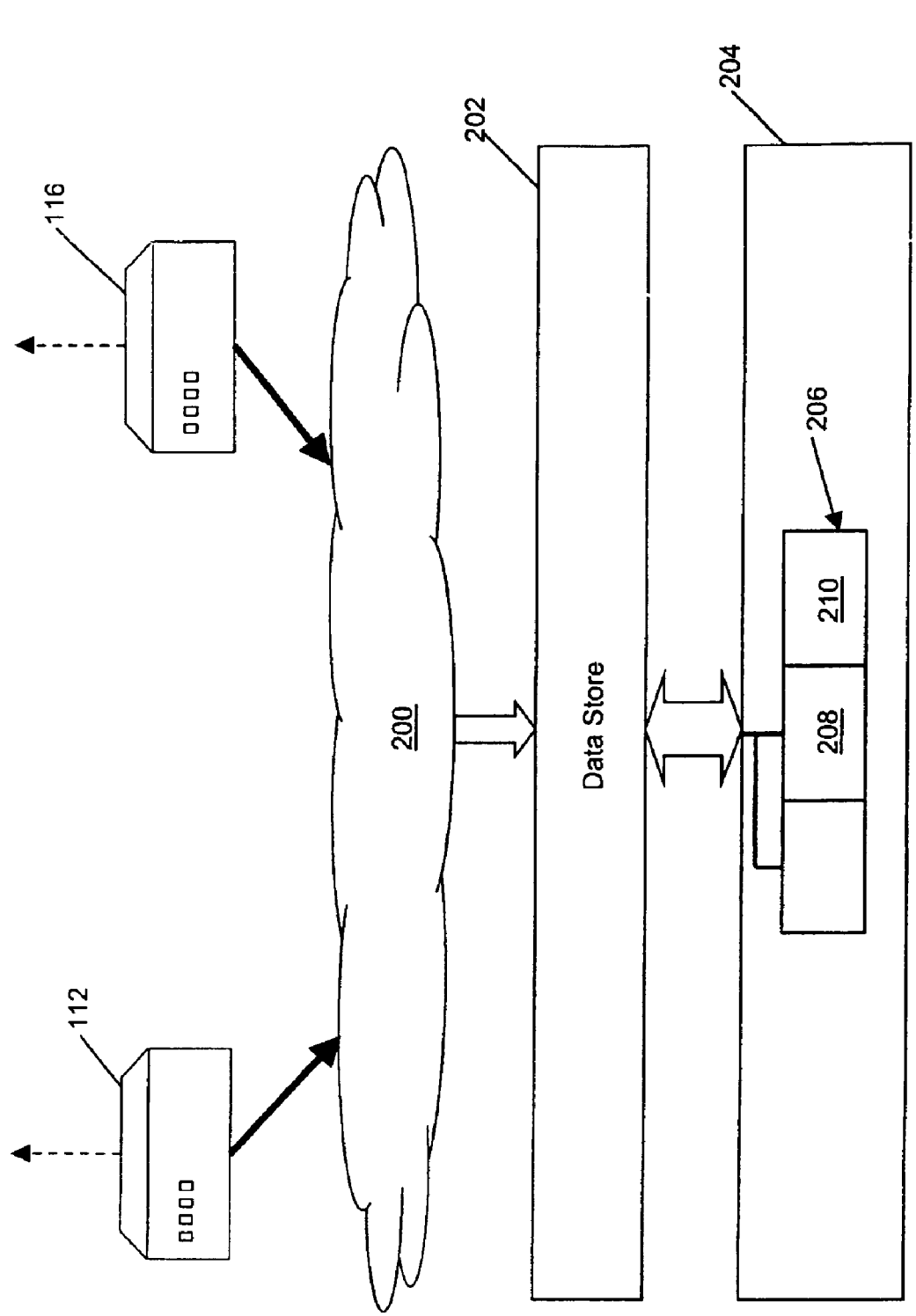
FIG. 2 is a schematic diagram of the monitoring system, a part of which is shown in FIG. 1, in greater detail.

Turning to FIG. 2, the first and second probes 112, 116 are each coupled to a monitoring support network 200, the monitoring support network 200 being, in this example, an IP network. The monitoring support network 200 is coupled to a data file 202.

The data store 202 is a store of for the data records, for example Call Detail Records (CDRs), Transaction Detail Records (TDRs) and Service Detail Records (SDRs). The data records can be collected for storage in the data store according to any technique known in the art, for example through use of a Data Management Component (DMC) that is part of an acceSS7 Business Intelligence Solution, available from Agilent Technologies UK Limited, and is supported by a relational database, such as an Oracle™ relational database. The data store 202 is coupled to a monitoring server 204 that supports a number of Operations Support Systems (OSS) applications 206, for example a correlating engine application 208 and a measurement engine application 210.

The monitoring server 204 is, in this example, coupled to a Local Area Network (LAN—not shown) at a service centre, one or more monitoring terminals (also not shown) being capable of communicating with the OSS applications 206 for the purpose of presenting alerts to one or more engineers charged with monitoring the operation of the communications network.

Figure 3:
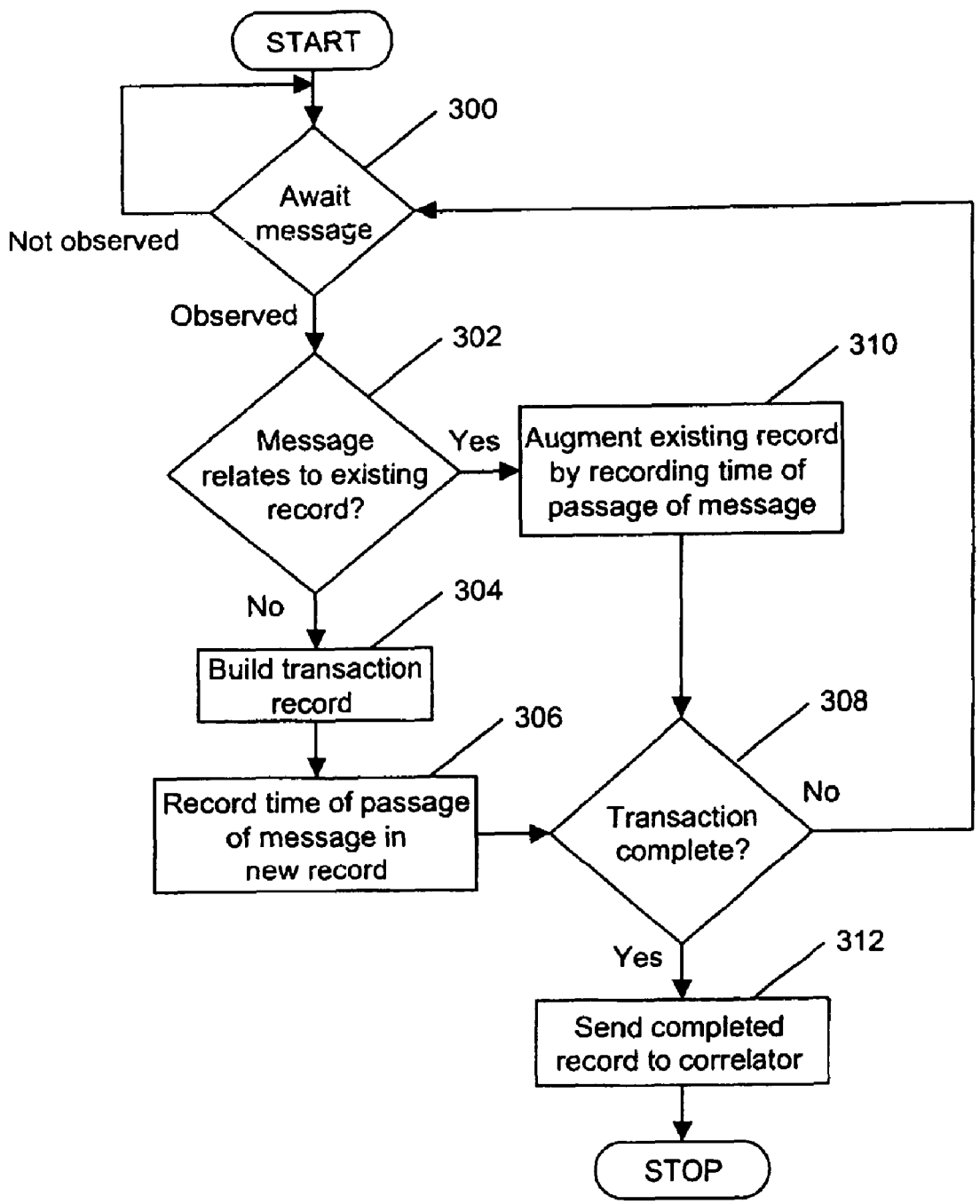
FIG. 3 is a flow diagram of a method of collecting data for the measuring system of FIGS. 1 and 2.

In operation (FIGS. 1 and 3), the client terminal 102 sends a first message, M1, constituting part of a communications transaction with the server 108, the transaction being a sequence of messages that accomplish a discrete or atomic action. In this example, the set of related messages that constitutes the discrete or atomic action is a SIP registration transaction involving the sending of a SIP Register message followed by a SIP 200 OK reply message. However, the skilled person will appreciate that the invention is not limited to this particular transaction and other transactions, SIP-related or otherwise, can be monitored.

The first probe 112 awaits (300) receipt of a copy of the first message, M1, via a first tap. Consequently, once sent, the first message, M1, passes the first point 114 in the communications link 110 and is observed by the first probe 112. The first probe 112 generates transaction identifying data derived from the content of the first message, M1, and uses the transaction identifying data to determine (302) whether the first message, M1, relates to a transaction record already generated by the first probe 112. The transaction identifying data is generated in accordance with known techniques for generating transaction identifiers for example using subscriber IDs, IMSI numbers, telephone numbers or even types of requests being made, and so will not be described further. In the present example, the first message, M1, has not previously been observed by the first probe 112 and so the first probe builds (304) a first transaction record specifically for the SIP registration transaction. The first transaction record holds the source address and the destination address of the first message, M1, as well as a key. In this example, the key is generated in accordance with known key generation techniques and is based upon the content of the payload and/or the content of the header field of one or more packets making up a stream of packets constituting the first message, M1. The first probe 112 then generates (306) a first timestamp, $TS1_{P1}$, recording the time of observation of the first message, M1, and records the first timestamp $TS1_{P1}$ in the newly built transaction record.

The first probe 112 then determines (308) whether the first message, M1, observed constitutes a final message of the SIP registration transaction. In this example, the first message, M1, is only the first message of a two-message transaction, and so the first probe 112 reverts to awaiting (300) observation of another message.

Unfortunately, the first message, M1, does not reach the server 108. This can happen for a number of reasons, for example, the first message, M1, can be dropped due to a temporary failure of the router 106. Consequently, after a time-out period, the client terminal 102 re-sends the first message, M1, the re-transmission of the first message, M1, being referred to hereafter as a re-sent first message, $M1_R$.

Once again, the first probe 112 observes the re-sent first message, $M1_R$, passing the first point 114 along the communications link 110 and determines (302) from the source address, the destination address and the message identifier of the re-sent first message, $M1_R$, whether or not the re-sent first message, $M1_R$, relates to an existing transaction record. Since the first message, M1, has already been observed by the first probe 112, the first transaction record already exists and so the first probe 112 generates (310) a second timestamp, $TS2_{P1}$, and adds the second timestamp, $TS2_{P1}$, to the first transaction record.

The first probe 112 then determines (308) whether the re-sent first message, $M1_R$, observed constitutes a final message of the SIP registration transaction. Again, the re-sent first message, $M1_R$, is only the first message of the two-message transaction that is the SIP registration transaction, and so the first probe 112 reverts to awaiting (300) observation of another message.

On this occasion, the re-sent first message, $M1_R$, is successfully forwarded by the router 106 and passes the second point 118 in the communications link 110 before reaching the server 108. Consequently, the re-sent first message, $M1_R$, is observed by the second probe 116, via a second tap, the second probe 116 awaiting (300) receipt of copies of messages passing the second point 118.

Since the re-sent first message, $M1_R$, has not previously been observed by the second probe 116, the second probe 116 determines (302) that the re-sent first message, $M1_R$, does not relate to an existing transaction record stored by the second probe 116. Consequently, the second probe 116 builds (304) a second transaction record and generates a first timestamp, $TS1_{P2}$, corresponding to the time of observation of the re-sent first message, $M1_R$, by the second probe 116. The second probe generated first timestamp, $TS1_{P2}$, is then recorded (306) in the second transaction record along with the source address and the destination address of the re-sent first message, $M1_R$, and a key.

The second probe 116 then determines (308) whether the re-sent first message, $M1_R$, observed constitutes a final message of the SIP registration transaction. in this example, the re-sent first message, $M1_R$, is only the first message of a two-message transaction, and so the second probe 116 reverts to awaiting (300) observation of another message.

Since the re-sent first message, $M1_R$, has reached the server 108, the server 108 is able to respond by sending a second message, M2, to the client terminal 102. In this example, the second message, M2, is a SIP 200 OK reply message. En route to the client terminal 102, the second message, M2, passes the second point 118 along the communications link 110 and so is observed by the second probe 116 awaiting (300) copies of messages passing the second point 118 as previously described.

Upon observation of the second message, M2, the second probe 116 determines (302), from a source address, a destination address and a message identifier of the second message, M2, whether or not the second message, M2, relates to an existing transaction record. Since the re-sent first message, $M1_R$, has already been observed by the second probe 116, the second transaction record already exists and so the second probe 116 generates (310) a second timestamp, $TS2_{P2}$, and adds the second timestamp, $TS2_{P2}$, to the second transaction record.

The second probe 116 then determines (308) whether the second message, M2, observed constitutes a final message of the SIP registration transaction. In the present example, the second message, M2, constitutes the final message of the SIP registration transaction and so, after a predetermined time-out period, the second probe 116 deems the second transaction record completed and sends (312) the second transaction record to the data store 202 via the monitoring support network 200 in accordance with an existing communication technique employed by the acceSS7 system.

In the course of its journey to the client terminal 102, the second message, M2, reaches the router 106 and is then forwarded by the router 106 to the client terminal 102. However, before reaching the client terminal 102, the second message, M2, passes the first point 114 along the communications link 110. Consequently, the second message, M2, is observed by the first probe 112, which is awaiting (300) copies of messages passing the first point 114 as previously described.

Upon observation of the second message, M2, the first probe 112 determines (302) from the source address, the destination address and the message identifier of the second message, M2, whether or not the second message, M2, relates to an existing transaction record. Since the re-sent first message, $M1_R$, has already been observed by the first probe 112, the first transaction record already exists and so the first probe 112 generates (310) a third timestamp, $TS3_{P1}$, and adds the third timestamp, $TS3_{P1}$, to the first transaction record.

The first probe 112 then determines (308) whether the second message, M2, observed constitutes the final message of the SIP registration transaction. As already mentioned above, the second message, M2, constitutes the final message of the SIP registration transaction and so, after a predetermined time-out period, the first probe 112 deems the first transaction record completed and sends (312) the first transaction record to the data store 202 via the monitoring support network 200.

Figure 4:
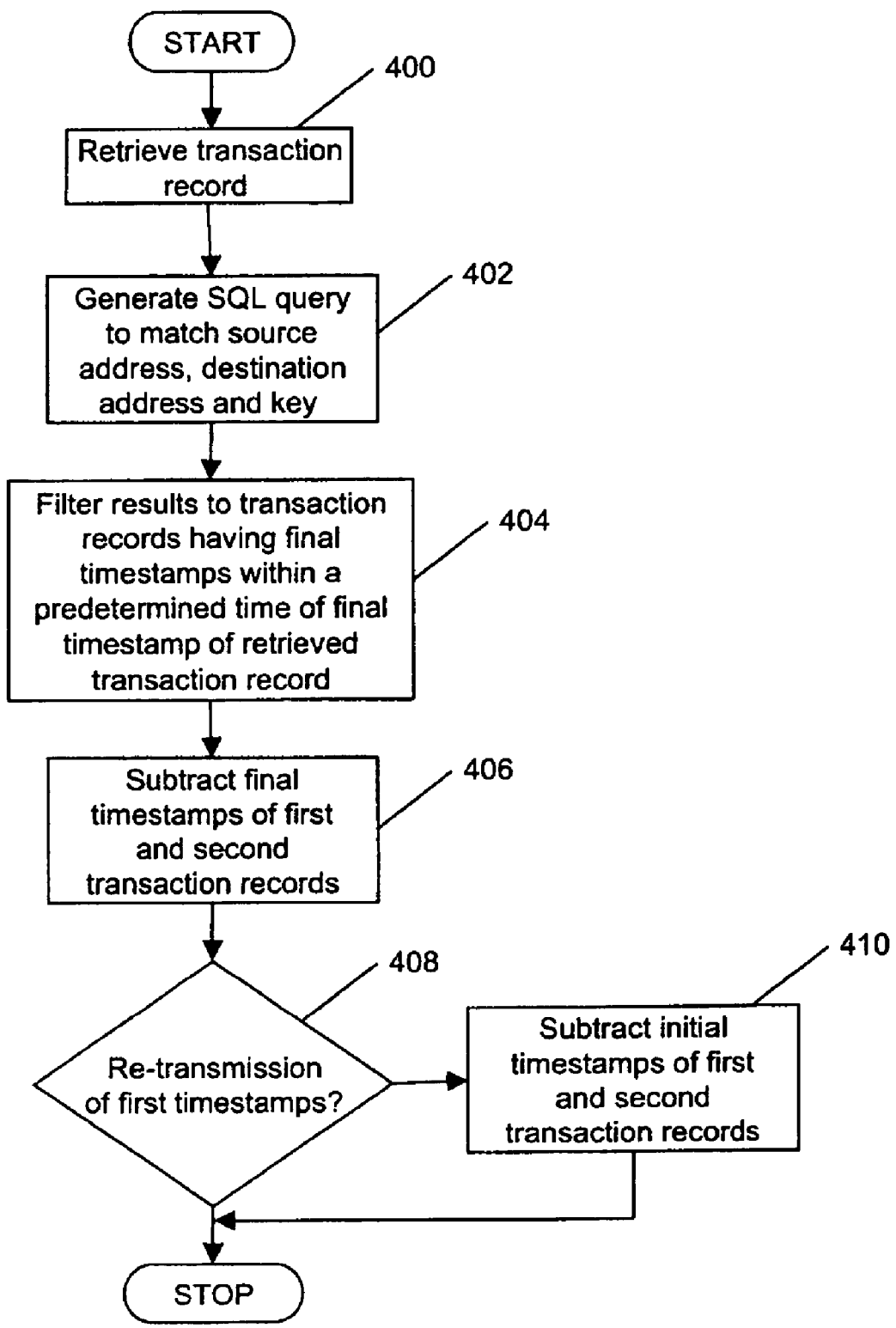
FIG. 4 is a flow diagram of a method of correlating transaction records and calculating transit metrics for the measuring system of FIGS. 1 and 2.

At the data store 202, the first and second transaction records are stored and accessed by OSS applications 206 that support traffic engineering and/or accounting applications. Referring to FIG. 4, the correlator engine 208 accesses the data store 202 and retrieves (400) a copy of a transaction record. In this example, the correlator engine 208 obtains a copy of the first transaction record.

The correlate engine 208 then builds (402) an SQL query that mines the data store 202 for transaction records having the same source address, destination address and key as the first transaction record initially retrieved from the data store 202. The results of the SQL query are then filtered to obtain only transaction records having final timestamps that are within a predetermined period of time from a final timestamp of the first transaction record. The predetermined period of time is chosen such that transaction records comprising at least one timestamp falling within the predetermined time period are extremely likely to relate to a same session of a transaction, for example within 10 seconds, such as within 5 seconds or within 2 seconds. In this example, the final timestamp of the first transaction record is the third timestamp, $TS3_{P1}$, and the second probe generated timestamp, $TS2_{P2}$, is, of course, within the predetermined period of time from the third timestamp, $TS3_{P1}$. Consequently, the result of the filtering yields the second transaction record as a match for the first transaction record.

Once transaction records have been correlated, the correlator engine 208 passes the matched transaction records, in this example the first and second transaction records, to the measurement engine 210. The measurement engine 210 then subtracts (406) the final timestamps, i.e. the third timestamp, $TS3_{P1}$ of the first transaction record and the second timestamp $TS2_{P2}$ of the second transaction record, to obtain a transit metric. In this example, the transit metric is a travel time of the second message, M2. However, the measurement engine 210 can determined (408) whether a non-zero uplink transmission count exists, i.e. whether in this example the first message, M1, was re-transmitted, and if not the measurement engine 210 can subtract (410) the initial timestamps of the first and second transaction records to yield another transit metric. In this example, the another transit metric is a transit time for the first message, M1, (assuming successful transmission and no hence no need for re-transmission), which when added to the transit time of the second message, M2, yields a round-trip time for the SIP registration transaction.

The transit metrics calculated can be tested against at least one predetermined threshold by the measurement engine 210 to generate one or more alerts to identify potential network problems.

Of course, the above calculations are based upon the transit metric being a measure of "wire speed" or switching latency. However, the skilled person will appreciate that, once correlated, a pair of time data stored in different transaction records can be used to determine latencies that include a measure of reliability, such as measurements including delays caused by dropped and/or lost packets.

Although, in the above example, use of probes has been specifically described, the skilled person will appreciate that the functionality of the probes (including the transaction building functionality) can be incorporated into a network node, such as a switch.

Alternative embodiments of the invention can be implemented as a computer program product for use with a computer system, the computer program product being, for example, a series of computer instructions stored on a tangible data recording medium, such as a diskette, CD-ROM, ROM, or fixed disk. The series of computer instructions can constitute all or part of the functionality described above, and can also be stored in any memory device, volatile or non-volatile, such as semiconductor, magnetic, optical or other memory device.

What is claimed is:

1. A measurement system for generating a transit metric, the apparatus comprising:
   a first probe for coupling to a first point in a communications network;
   a second probe for coupling to a second point in the communications network;
   a first data record builder associated with the first probe and arranged to generate, when in use, a first record comprising first observation data relating to a transaction comprising a plurality of messages exchanged among devices on the communications network, the first observation data comprising a time stamp of a final message of the transaction recorded by the first data record builder, the first data record builder configured to forward the first record upon completion of the transaction;
   a second data record builder associated with the second probe and arranged to generate, when in use, a second record comprising second observation data relating to the transaction, the second observation data comprising a time stamp of a final message of the transaction recorded by the second data record builder, the second data record builder configured to forward the second record upon completion of the transaction;
   a correlator arranged to receive the first and second records and to generate a query to determine, when in use, that the first and second records relate to the transaction and to filter the first and second records relating to the transaction to obtain records having final message timestamps within a predetermined period of time; and
   a measurement component arranged to use, when in use, at least respective parts of the first and second records having final message timestamps within the predetermined period of time to calculate a transit metric related to the transaction.

2. A system as claimed in claim 1, wherein the first observation data comprises first time data corresponding to a first at least one time of observation of at least one message of the plurality of messages.

3. A system as claimed in claim 2, where the second observation data comprises second time data corresponding to a second at least one time of observation of the at least one message.

4. A system as claimed in claim 3, wherein the measurement component is arranged to calculate the transit metric for the transaction using at least respective parts of the first and second time data.

5. The system of claim 3, wherein the correlator is arranged to analyse at least part of the first and second time data to determine whether the at least part of the first and second time data is separated by less than a predetermined period of time.

6. A system as claimed in claim 1, wherein the correlator is arranged to determine, when in use, that the first record and the second record relate to the transaction by matching data contained in the first and second records.

7. A system as claimed in claim 6, wherein the first and second records comprise at least one of: a source address, a destination address and/or a key.

8. A system as claimed in claim 1, wherein the correlator is further arranged to analyse at least part of the first and second observation data to determine whether the at least part of the first and second observation data complies with a predetermined inequality.

9. A system as claimed in claim 8, wherein the correlator is arranged to determine, when in use, that the first record with the second record relate to the transaction by matching data contained in the first and second records.

10. A system as claimed in claim 1, wherein the transit metric is a one-way travel time.

11. The system of claim 1, wherein the transit metric is a round-trip delay time.

12. A method of generating a transit metric in a communications network, the method comprising:
- using a first probe to make a first observation in relation to a transaction comprising a plurality of messages exchanged among devices on the communications network, at a first point in the communications network;
- using a first data record builder to generate a first record comprising first observation data relating to the transaction, the first observation data comprising a time stamp of a final message of the transaction recorded by the first data record builder, and to forward the first record upon completion of the transaction;
- using a second probe to make a second observation in relation to the transaction at a second point in the communications network;
- using a second data record builder to generate a second record comprising second observation data relating to the transaction, the second observation data comprising a time stamp of a final message of the transaction recorded by the second data record builder, and to forward the second record upon completion of the transaction;
- using a correlator to generate a query to correlate the first and second records relating to the transaction and to filter the first and second records relating to the transaction to obtain records having final message timestamps within a predetermined period of time; and
- using a measurement component to calculate a transit metric related to the transaction using at least respective parts of the first and second records having final message timestamps within the predetermined period of time.

13. A method as claimed in claim 12, wherein the first and second observations comprise time stamps corresponding to a time of observation of the one or more messages.

14. A computer program product, stored in a memory device embodied with a computer program product comprising computer program code to make a computer execute a method comprising:
- using a first probe to make a first observation in relation to a transaction comprising a plurality of messages exchanged among devices on the communications network at a first point in the communications network;
- using a first data record builder to generate a first record comprising first observation data relating to the transaction, the first observation data comprising a time stamp of a final message of the transaction recorded by the first data record builder, and to forward the first record upon completion of the transaction;
- using a second probe to make a second observation in relation to the transaction at a second point in the communications network;
- using a second data record builder to generate a second record comprising second observation data relating to the transaction, the second observation data comprising a time stamp of a final message of the transaction recorded by the second data record builder, and to forward the second record upon completion of the transaction;
- using a correlator to generate a query to correlate the first and second records relating to the transaction and to filter the first and second records relating to the transaction to obtain records having final message timestamps within a predetermined period of time; and
- using a measurement component to calculate a transit metric related to the transaction using at least respective parts of the first and second records having final message timestamps within the predetermined period of time.

* * * * *